United States Patent
Stirling et al.

(10) Patent No.: US 9,824,329 B2
(45) Date of Patent: Nov. 21, 2017

(54) METHOD AND SYSTEM FOR IMPLEMENTING INTEGRATED LOGISTICS QUERIES

(71) Applicant: Oracle International Corporation, Redwood Shores, CA (US)

(72) Inventors: Jonathan Stirling, Lone Tree, CO (US); Pradeesh Krishnan, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 301 days.

(21) Appl. No.: 14/491,938

(22) Filed: Sep. 19, 2014

(65) Prior Publication Data

US 2015/0081743 A1   Mar. 19, 2015

Related U.S. Application Data

(60) Provisional application No. 61/879,978, filed on Sep. 19, 2013.

(51) Int. Cl.
*G06Q 10/08* (2012.01)

(52) U.S. Cl.
CPC .................. *G06Q 10/087* (2013.01)

(58) Field of Classification Search
USPC ........................................................ 707/802
See application file for complete search history.

(56) References Cited

U.S. PATENT DOCUMENTS

| | | | |
|---|---|---|---|
| 5,257,365 A * | 10/1993 | Powers ............. | G06F 17/30327 |
| 9,542,478 B2 | 1/2017 | Eide et al. | |
| 2003/0135512 A1 * | 7/2003 | Morgan, Jr. ...... | G06F 17/30882 |
| 2008/0208906 A1 * | 8/2008 | Penner ................... | G06F 17/248 |
| 2008/0250318 A1 * | 10/2008 | Walter ................... | G06F 17/245 715/713 |
| 2008/0282189 A1 * | 11/2008 | Hofmann .............. | G06F 17/212 715/793 |
| 2011/0225527 A1 * | 9/2011 | Law ........................ | G06Q 10/10 715/764 |
| 2011/0289106 A1 * | 11/2011 | Rankin, Jr. ............ | G06Q 10/10 707/769 |
| 2012/0144334 A1 * | 6/2012 | Reichert .............. | G06Q 10/087 715/771 |
| 2014/0244573 A1 * | 8/2014 | Gonsalves ........ | G06F 17/30592 707/606 |
| 2014/0266618 A1 * | 9/2014 | Jones ................... | G06Q 10/087 340/10.1 |
| 2014/0304282 A1 | 10/2014 | Eide et al. | |

OTHER PUBLICATIONS

NPL1 Name: Inventory License Plating & Wireless Warehouse Operations. Title: Inventory License Plating—New System Dimension Streamlines Warehouse Operations for Food Industry, by Kate Mayer on Oct. 2, 2012. pp. 1-5.*

* cited by examiner

*Primary Examiner* — Rehana Perveen
*Assistant Examiner* — Hicham Skhoun
(74) *Attorney, Agent, or Firm* — Vista IP Law Group, LLP

(57) ABSTRACT

Disclosed are improved methods, systems, and computer program products to manage, access, and inquire into logistics data, such as warehouse data, inventory data, and license plate data, to create an integrated logistics data set for display on a mobile computer.

22 Claims, 15 Drawing Sheets

| LPN | Parent LPN | Qt. Ass. | Qt. Avail. | Qt. On-Hand | Prim. UOM | Qt. Hard Comm. | Sum LPQt On-Hand | SumLPQtyHard Comm. |
|---|---|---|---|---|---|---|---|---|
| W30-851 | | 1 | 3 | 5 | EA | 2 | 5 | 2 |
| W30-123 | | 1 | 7 | 10 | EA | 3 | 24 | 17 |
| W30-234 | | | 0 | | EA | | 101 | 90 |
| W30-456 | W30-123 | 1 | 0 | 14 | EA | 14 | 14 | 14 |
| W30-678 | W30-234 | | 0 | | EA | 0 | 35 | 32 |
| W30-901 | W30-234 | | 0 | 50 | EA | 50 | 66 | 58 |
| W30-789 | W30-678 | 1 | 0 | 15 | EA | 15 | 15 | 15 |
| W30-912 | W30-678 | 1 | 3 | 20 | EA | 17 | 20 | 17 |
| W30-345 | W30-901 | 1 | 8 | 16 | EA | 8 | 16 | 8 |

METHOD AND SYSTEM FOR IMPLEMENTING INTEGRATED LOGISTICS QUERIES

CROSS REFERENCE TO RELATED APPLICATIONS

This application claims the benefit of priority to U.S. Provisional Application Ser. No. 61/879,978, filed Sep. 19, 2013, which is incorporated herein by reference in its entirety.

BACKGROUND

The present application relates to systems, methods, and computer program products for implementing integrated logistics queries.

Many types of business logic are implemented by software applications, such as enterprise software applications. For example, many enterprise applications are focused on business logic to perform logistics operations such as supply chain management. A warehouse management system is one type of enterprise application that is often used to manage and track data pertaining to a supply chain. These systems are employed to control the movement and storage of materials within a warehouse and to process associated transactions pertaining to inventory for the warehouse. Such transactions include, for example, including inventory management, shipping, receiving, put-away, and picking transactions. Therefore, warehouse management systems are used to handle the receipt, storage, and movement of goods for customers and companies.

In the context of distribution centers, users of warehouse management systems often require the ability to review inventory availability, as well as the relationship between items at a given location, and also the license plate groupings for a particular group of items. This information is often needed at locations where a computer or workstation with access to logistics programs is not available. For example, a supply chain manager in the middle of a large warehouse might need access to logistics information but is not near the appropriate workstation with inventory programs, which may be hundreds of feet away, or in a different building, for instance.

This makes it difficult for the user to determine the structure of items in the given location. For example, it becomes very difficult to determine whether a given item relates to a pallet, case, box, and/or each ("EA") structure, if any. Further, within a license plate controlled branch, a user also needs to determine license plates that group items and lots for that location.

Therefore, with conventional management systems, users within a distribution center do not have the ability to view item information originating from either the inventory, warehouse, or license plate systems. Users are forced to use three different system applications to view the item availability for a given item, lot, location, license plate, and warehouse detail structure, all of which a user in a remote location may not have access to. Instead, they are required to find a workstation to view the logistics information, which slows down operational and logistics efficiency, and worse, a user who does not have the time or access to a workstation may be forced to make guesses, which may be incorrect, about item inventory and other logistics information.

As is evident, there is a need for an improved approach that addresses these problems associated with the prior approaches to implement enterprise applications and logistics queries.

DESCRIPTION OF THE DRAWINGS

FIG. 7 illustrates an example screen display of a system implementing integrated logistics data.

FIG. 8A illustrates an example screen display of a system implementing integrated logistics data.

DETAILED DESCRIPTION

Figure 1:
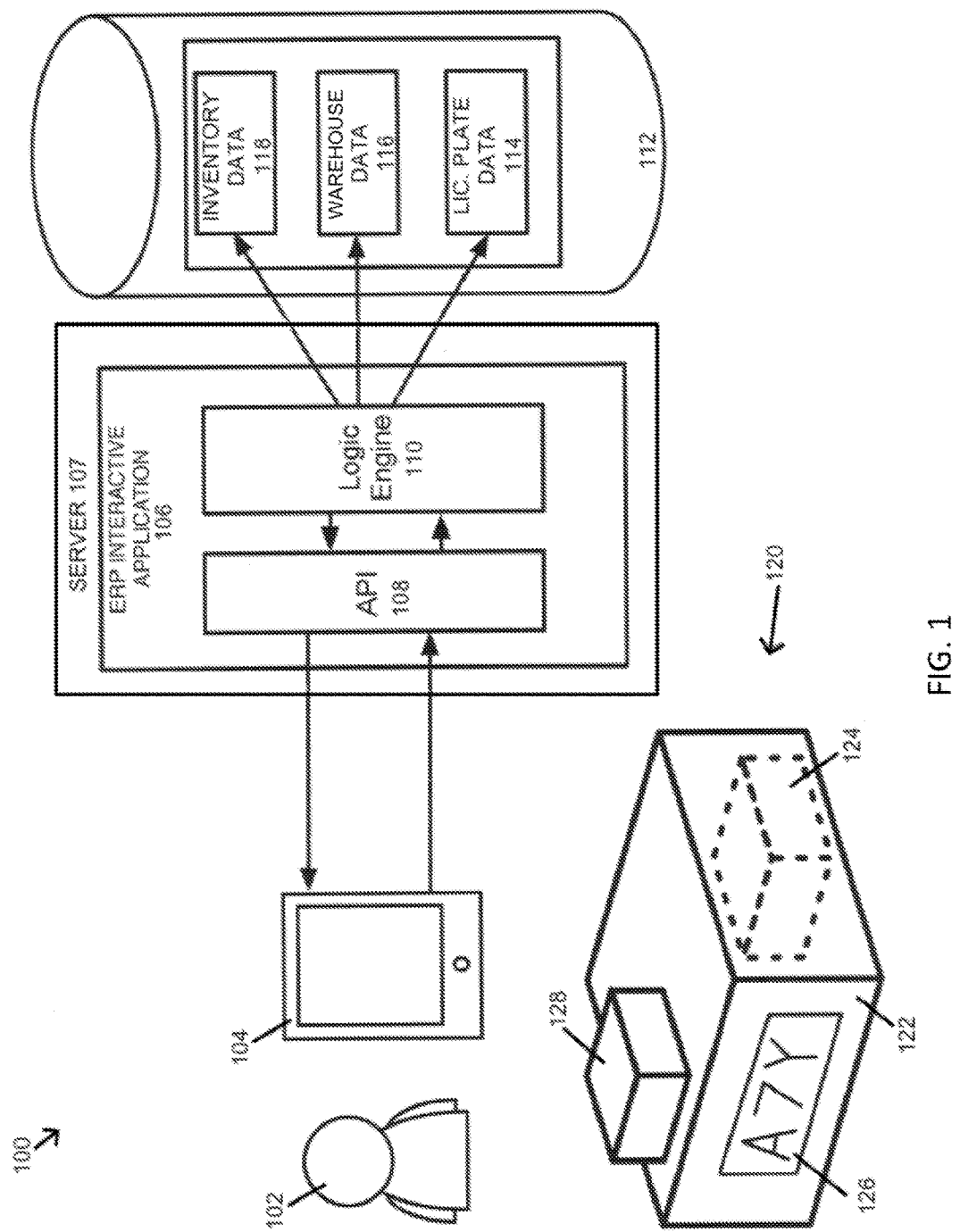
FIG. 1 illustrates an example system for integrated logistics data processing.

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of enterprise applications for warehouse management. It is noted, however, that the invention is not limited in its scope to warehouse management applications, and indeed, may be applied to other types of applications as well.

Some embodiments of the invention address the above problems using an improved method and apparatus to manage logistics data. In embodiments of the invention, users are not limited to accessing logistics data using a desktop computer. Instead, users will be provided visibility of available items within a warehouse via a mobile platform, e.g., a tablet application, that has the ability to intelligently access a number of logistics information sources and display the information in a integrated fashion to the user in the field.

FIG. 1 shows an example architecture of a system 100 for implementing integrated logistics queries according to some embodiments of the invention. The system 100 may include one or more users 102, and one or more mobile computing devices 104, such as a tablet computer or cellular phone. However the systems and methods disclose herein may be utilized on desktop workstations and the like.

Figure 2:
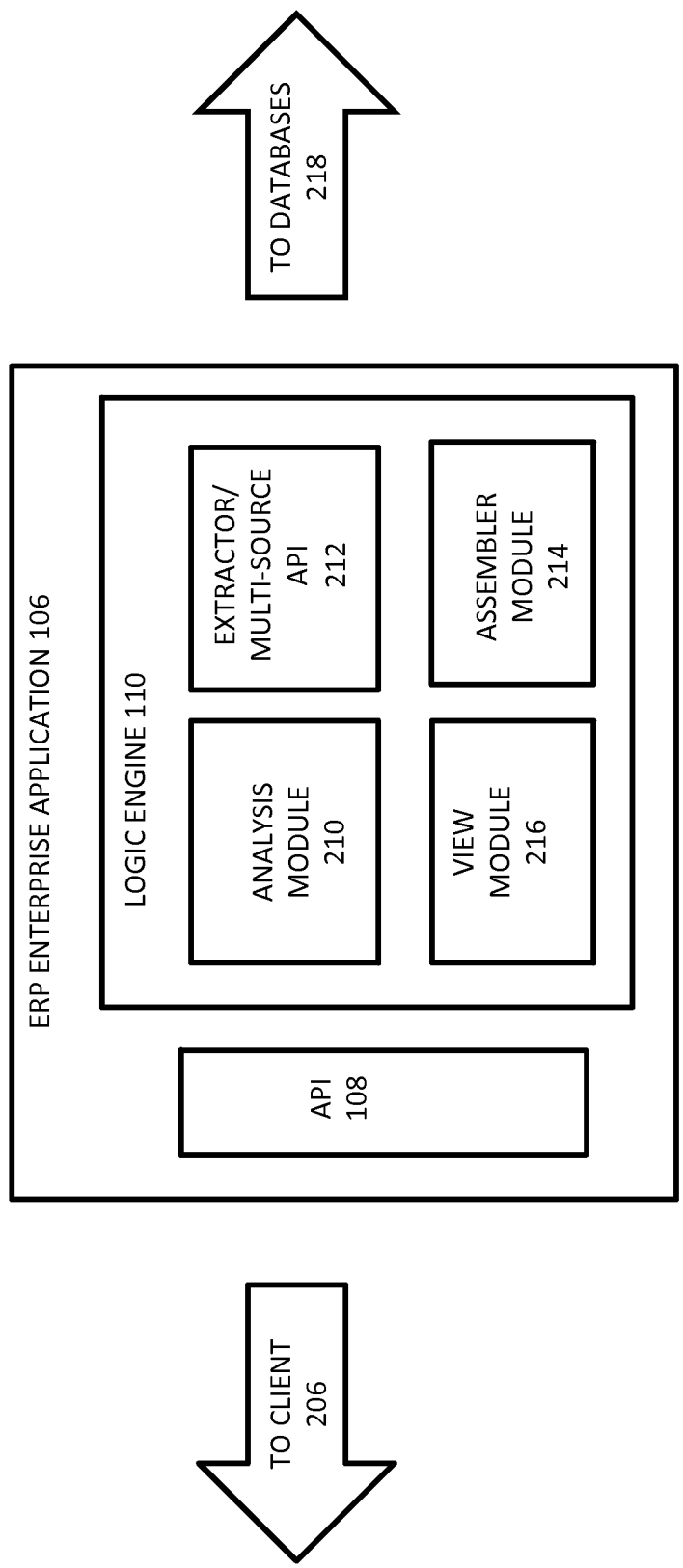
FIG. 2 illustrates an example application system for integrated logistics data processing.

The user 102 operates the system 100 to access and utilize applications on an application server 107, to perform any activities operable using the application 106, such as an enterprise resource planning (ERP) interactive application. The ERP interactive application 106 may include an application protocol interface (API) 108 which is configured to exchange information with the client device 104. Further, the ERP interactive application 106 may also comprise a logic engine 110 that analyzes what information is required to process integrated logistics query and configures views as explained below. The logic engine 110 interfaces with one or more information sources 112, such as databases, through a multi-source API 212 (FIG. 2). The databases accessed may include an inventory database 118, a warehouse information database 116, and a license plate information database 114. Examples of information that may be stored in a database that contains inventory data 118 include the number of items available, the number of items on hand, or the number of items physically present but committed. Examples of information that may be stored in a database that contains warehouse data include locations of items, the locations of branches or plants, the zones or areas that are reserved for certain items within branches or plants, information concerning logistics such as shipping and handling information, and information regarding the physical dimensions of items such as size and weight. Examples of information that would be stored in database that contains license plate data is license plate data for each item with an assigned license plate, including additional information used to describe the items which may be customized per project implementation, such as license plate items on hand or available. A license plate number is a type of abstract container or data reference that may be used to hold or refer to items. For instance, in much the same way a cardboard box can hold a number of physical items, a license plate number (LPN) can be used to refer to a collection of items which may or may not be physical in nature.

As an illustrative example, a user 102 may be in the middle of a warehouse (not depicted) standing in front of a group of assets 120. The group of assets 120 may correspond to a number of items on a pallet, for example, where it may be typical that the top-level item 122, such as a pallet, contains a number of lots 124, which may further contain a number of cartons, etc., thus creating a nested group of assets with an implicit hierarchy (i.e. the top level item 122 may be on one level, and the lots 124 may be on a second level, etc.). The group of assets 120 may also contain loose items 128 that may have been temporarily or carelessly set on top of the pallet for later organization or processing, as may be typical in busy warehouse environments.

An item identifier 126 is illustrated on the top level item 122. The item identifier 126 may correspond to an item number or a license plate number, that can be used to track, identify or otherwise process items. The lower level items such as the lots 124 or any further nested items may also feature item identifiers. The item identifier shown is merely illustrative and one of ordinary skill in the art appreciates that any sort of identification symbol, such as item number, license plate number, bar code, or alpha numeric identifiers, may also be used.

In the past, if the user 102 need to understand what was in the group of items 120 to make operational decisions, he/she would have limited options such as writing down the item identifier 126 and going to the proper workstation, which may be located hundreds of feet away, to retrieve information concerning the group of items 120; or physically taking apart the group of items 120 and look inside to ascertain their structural relationships. However, both approaches may not be practical given many warehouse situations. For example, the pallet may be specially wrapped or sealed up, and the user may not be able to take apart the pallet; or for instance, under the time pressure typical of a logistics or warehouse environment, walking over to a computer workstation to look up item information may not commercially practical. In contrast, a user using the systems and methods disclosed herein could use the client device 104 to scan or otherwise input the item identifier 126 to retrieve information from a number of databases 112, where the results are processed and integrated into an easy to read layout on the client device 104.

FIG. 2 shows a more detailed illustration of the ERP interactive application 106 and the logic engine 110. The logic engine may be comprised of a plurality of modules such as an analysis module 210, an extractor multi-source API 212, an assembler module 214, and a view configuration module 216. Further, the logic engine may interface with a client 206 using API 108. The analysis module 210 operates to receive the query for logistics information and to determine what information should be requested or extracted from the databases 218. The extractor module 212 acts as a multi-source API to retrieve the logistics information from any number of different databases, each of which may use specific protocols. The assembler module 214 receives the multiple sets of logistics information from the one or more databases, and assembles them into an integrated logistics data set using techniques such as summarization and integration, which are described in more detail below. The view configuration module 216 configures a view so that the client device may display the integrated logistics data in an easy to read fashion.

Figure 3A:
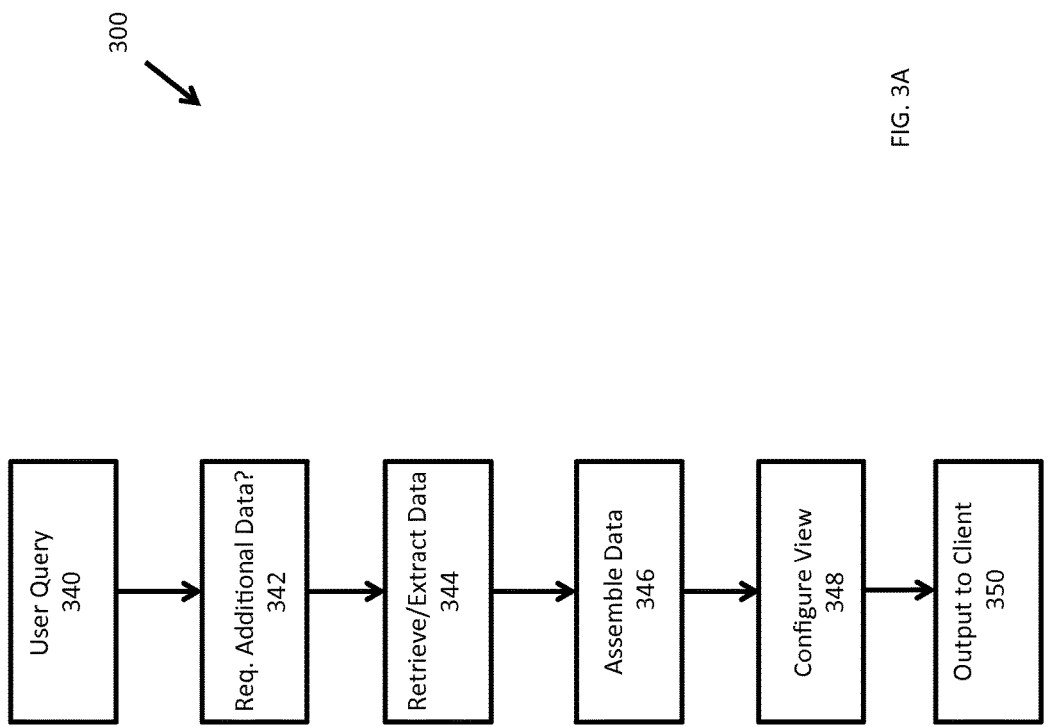
FIG. 3A shows an example method for implementing integrated logistics data.

FIG. 3A shows an example high-level flowchart of how an integrated logistics process 300 may be carried out. At step 340, the user query is received. As explained, the user query may be the item number or license plate number for an item, or a branch or pallet location. Once the system receives the user query, a determination is made whether additional information should be retrieved at step 342. For example, if the query was a license plate number, a determination is made whether additional warehouse data or inventory data should be retrieved in addition to the license plate data. Whereas, for example, in a company warehouse that does not implement license plating, the user query might be for a pallet location, in which case the determination in step 342 would be directed to whether inventory data or other data should be retrieved in addition to the pallet data.

At step 344, the user query data and any additional required data from step 342 is retrieved and extracted from a number of databases or information sources. As explained below, the databases or information sources that supply the user query data and or any additional data may require different access protocols, thus a multi-source API or extraction module may be implemented.

At step 346, the data that is retrieved and extracted at step 344 is assembled, parsed, or otherwise processed so that it may be more easily used by a client or user. For example, a license plate tree structure can be created through a summarization process, as discussed below. An additional process that may assemble data is in integration process wherein the data from different sources is matched and/or collated to create one integrated table for the client device to display.

At step 348, a view is configured. The configuration view step may be completed as part of the logic engine, or alternatively as part of the client device 104. The view configuration step uses the integrated logistics data that is processed at step 346, and further may use, or send structure or form data, such as HTML/CSS layout data and/or JavaScript, to the client device so that the integrated logistics data may be displayed in an easy to read fashion. At step 350, the integrated logistics data set may be sent for further processing or display.

Figure 3B:
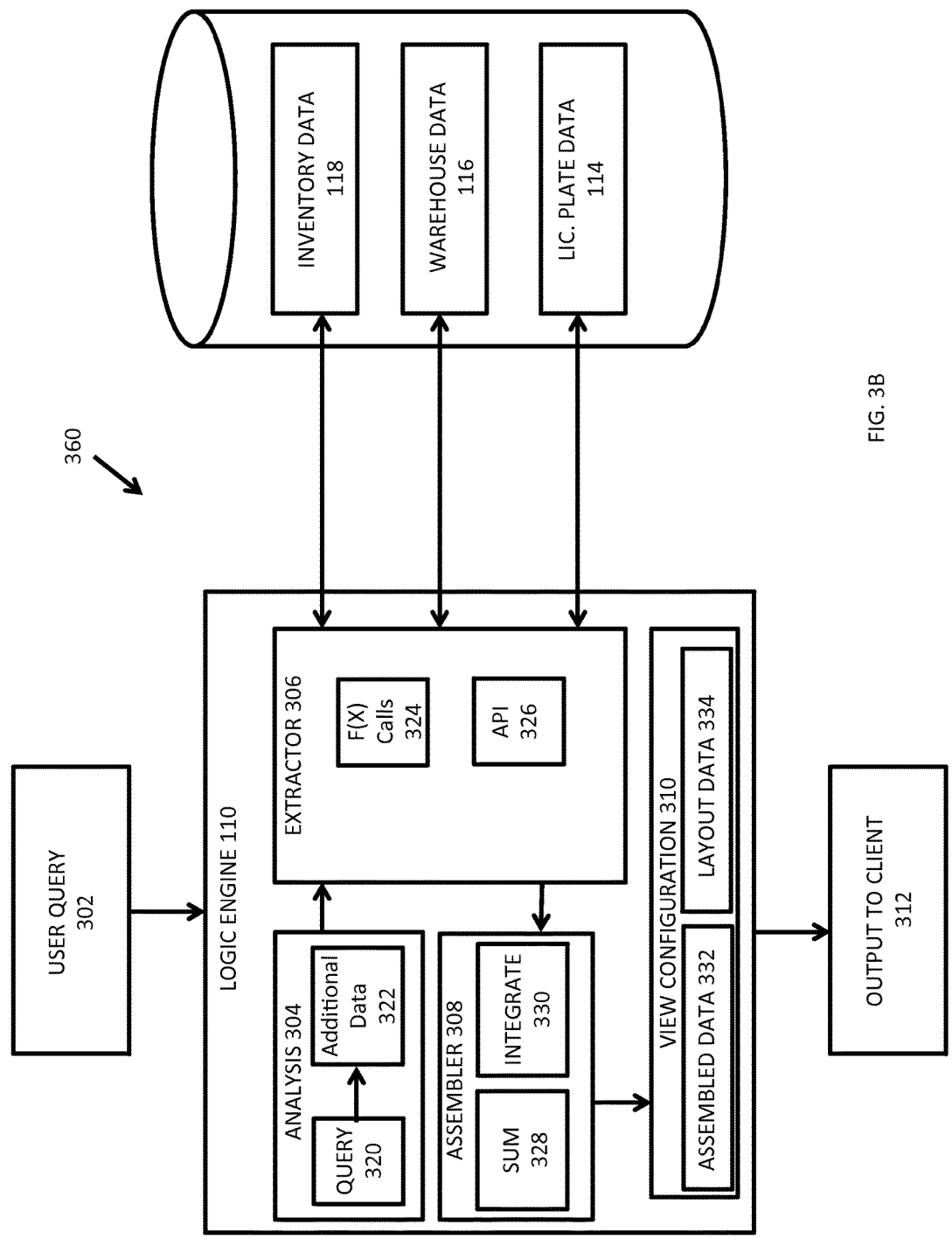
FIG. 3B shows an example system process for implementing integrated logistics data.

FIG. 3B shows an additional example of how the process may be implemented. At 302, a user enters the query term, such as an item number, into the client device using available input methods, such as scanning the item number or manually entering it on an in-screen keyboard. At 304, the analysis module receives the user query 320 and determines what kind of data was received, e.g. a branch identifier, item number, and determines what additional data 322 is required to complete the query. For example, if the queried item has or is associated with a license plate number, the analysis module may synthesize a request for related license plate data, and also additional data such as inventory or warehouse.

The analysis module 304 then passes the information set requested to the extractor, at 306. The extractor may be configured as a multi-source API, that can contact multiple information sources and extract information from them even if they use different protocols. For example, if the data sources, such as inventory data 118, warehouse data 116, and license plate data 114, are all within an enterprise platform, then function calls 324 may be used to extract the information from each of the sources. In contrast, if the license plate data 114 and the warehouse data 116 existed within an enterprise platform, and however, the inventory data 118 existed outside the enterprise platform, on an external website for example, then the extractor 306 may use a function call 324 to extract the warehouse data 116 and the license plate data 114, but then may use an API 326 to retrieve the inventory data 118. In this way, the extractor 306 is capable of retrieving any additional information requested from the analysis module 304.

Once the appropriate data is retrieved, the extractor may send the data to an assembler at 308. The assembler parses and processes the data retrieved to create integrated logistics data for the user. For example, if license plate data is retrieved in a table form, the assembler may use a summarizing process 328 to create a relational hierarchy for the license plate data. As another example, data retrieved from the inventory database 118 and warehouse database 116 on a given item 122 may be integrated 330 so that a user can view both the inventory data (e.g. how many items are on-hand), and the warehouse data (e.g. the physical dimensions of a item) in one view on the client device 104.

At 310, a view may be configured for the integrated logistics data so that the data is more human readable and easier to manipulate on the client device, which may have limited screen size or memory. For example, the view may be configured to show data from all three databases in one integrated table in a window, and other data sets spatially nearby in expandable or collapsible windows. Thus the view configuration step configures the assembled data 332 to work with the layout data 334, which may be HTML/CSS or JavaScript for example. Alternatively, the client device 104 may have the capability to configure the view using the assembled data from 308. Thus, at least in some implementations, view configuration at 310 may not occur within the logic engine, but rather in the client device.

At 312, the assembled data, such as an integrated logistics data set, and the layout data 334 may be outputted to the client device for display, manipulation, and further information queries.

Figure 4:
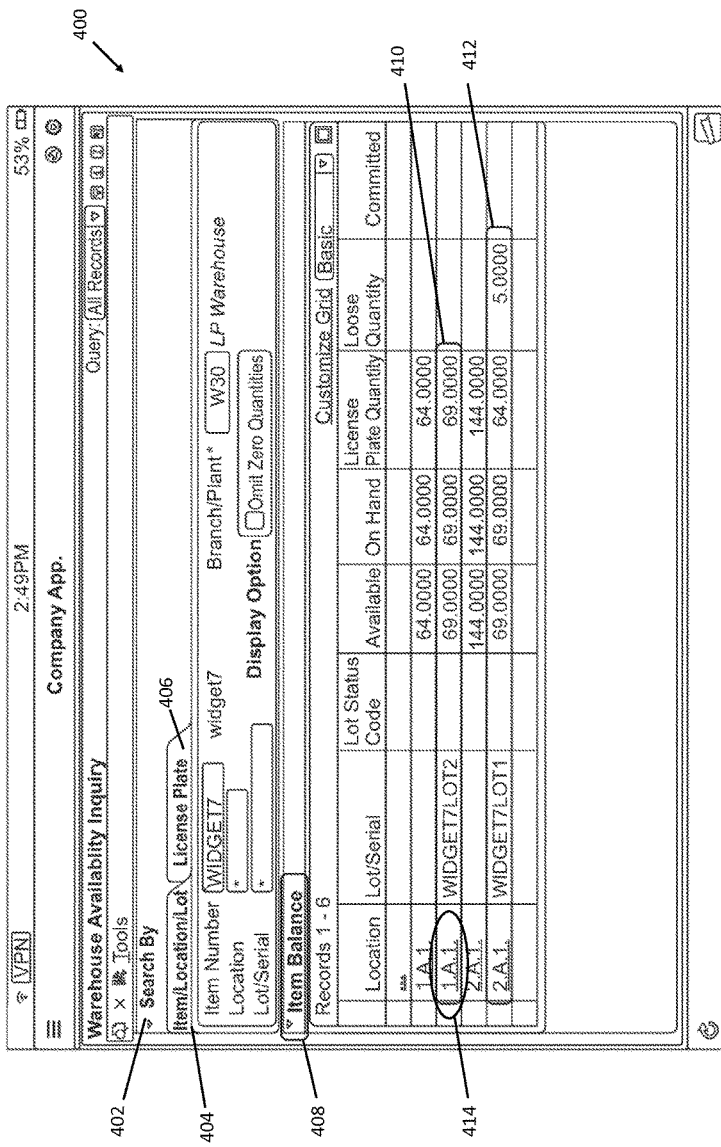
FIG. 4 illustrates an example screen display of a system implementing integrated logistics data.

FIG. 4 illustrates an example user interface 400 to display the data returned by an integrated logistics query using the systems and methods disclosed. In a search area 402 the interface permits a user is to search using a number of parameters, such as item/location/lot data 404 or license plate data 406. For example, in the item/location/lot data 404 area, the user may search by the item number, a location, such as the location of the pallet, the lot or item number, or the branch or plant identifier. In some embodiments a branch identifier or other terms might be required in addition to an item number to narrow the search and increase efficiency. Additionally, the user may be able to check a box that "omits zero quantities", which allows only nonzero results to be returned to the user.

As an example, the user can enter the item number such as "widget7" to initiate an integrated logistics query. The system may query the databases and process the information, and return information in an Item Balance window 408. The item balance window may feature number of columns and rows. For example here, when a user searches widget7 the information returned is in the form of columns including data such as the location, the lot or item number, the lot status code, the number of items available, the number of items on hand, the license plate quantity and a loose quantity.

Figure 5:
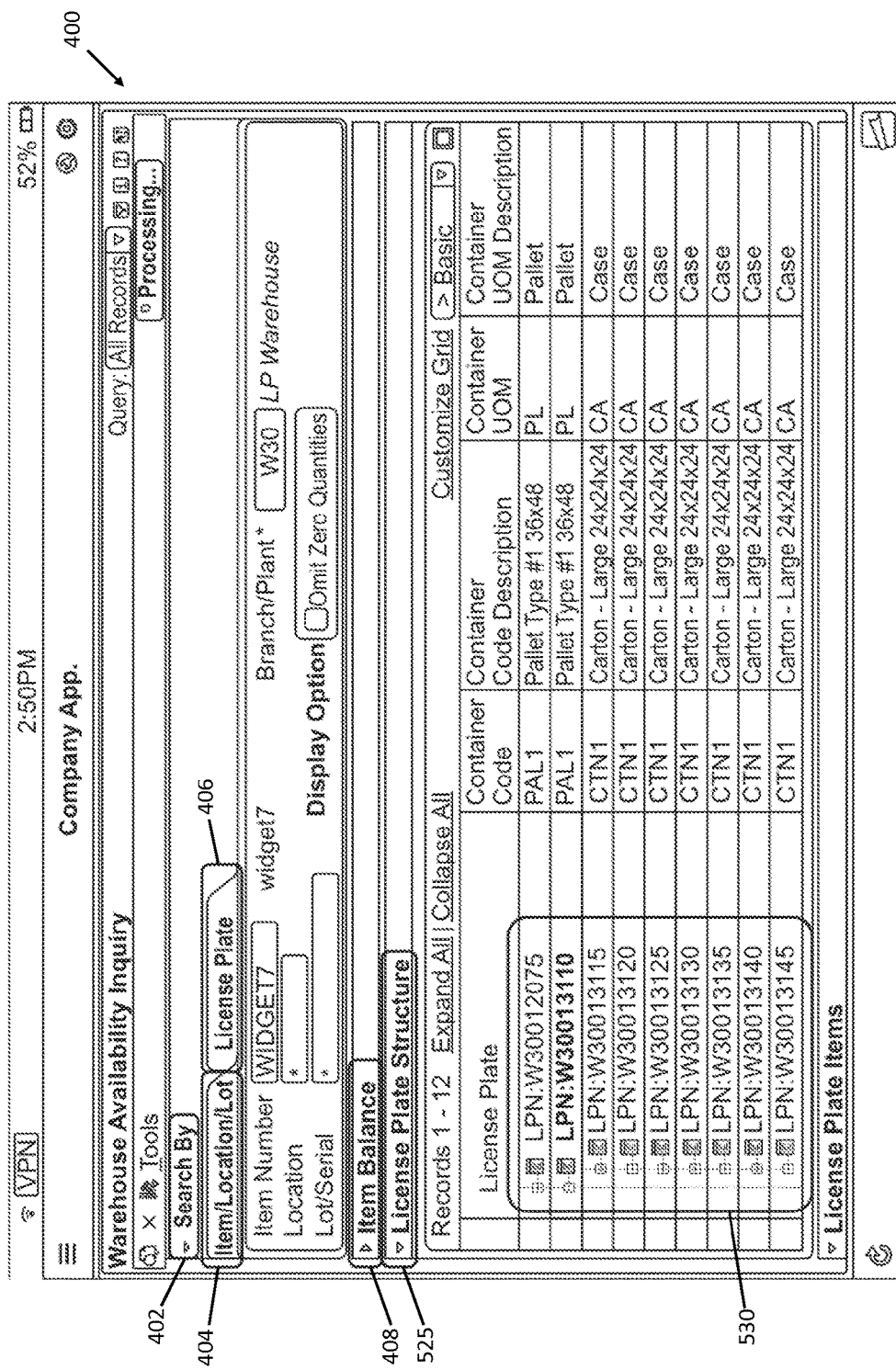
FIG. 5 illustrates an example screen display of a system implementing integrated logistics data.

If the user clicks on specific location data 414, which may be displayed as an action structure, such as a hyperlink or button, the application may collapse the item balance window 408 and expand a license plate structure window 525 as shown in FIG. 5. There, the license plate structure for the specified location is displayed as a hierarchical tree in a column 530, accompanied by other data columns, such as a container code, a container code description, which may describe the physical aspects of the container, the container unit of measurement (UOM), and a container UOM description.

Figure 6:
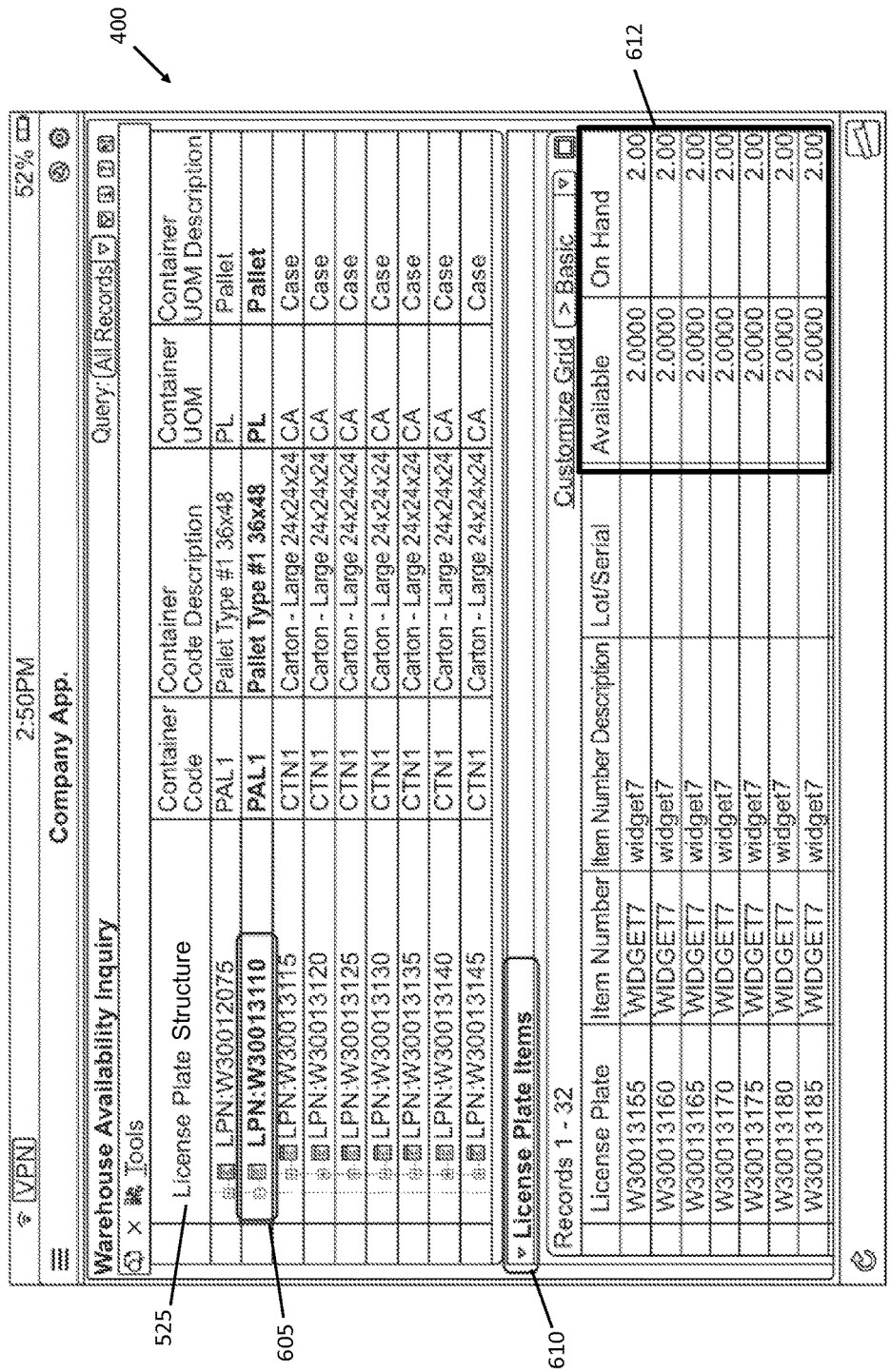
FIG. 6 illustrates an example screen display of a system implementing integrated logistics data.

Continuing to FIG. 6, a user may then click on a specific license plate number 605 in the license plate structure window 525 which may pop up a sub-form window of license plate items 610 which may share the screen space with the license plate structure window 525, or may alternatively take over the entire screen and collapse the license plate structure window.

In one embodiment, the sub-form window for license plate items 610 displays items that are associated with the selected license plate 605. In other embodiments, the license plate items 610 sub-form may allow a user to review specific item license plates for any item. Also the license plate items may display parents and children of the license plates, and/or be accompanied by other columns such as data from the license plate database.

Notable here is that the "Available" and "On-hand" columns 612 may share a similar name with the columns shown in FIG. 4. However, at least in the example discussed here, the information from column 612 is from the license plate database, whereas the "Available" and "On-hand" data shown in FIG. 4 is from the inventory database. One difference is that while data from the inventory database typically corresponds to what is physically available or on-hand, the license plate data corresponds only to items that have been assigned a license plate number.

One of ordinary skill in the art will immediately appreciate that the license plate structure tree and the license plate items allow significant efficiencies to be realized. For example, a user in the middle of the warehouse standing in front of a group of assets 120 can use the system 100 to immediately drill down into the group of assets 120 to discover their implicit hierarchical structure in an easy to read integrated view, all without leaving the site to access multiple applications or databases, or physically deconstructing the group of items. Additional efficiencies are created by integrating information from a plurality of databases into a single view using customizable columns and collapsible windows.

Figure 7:
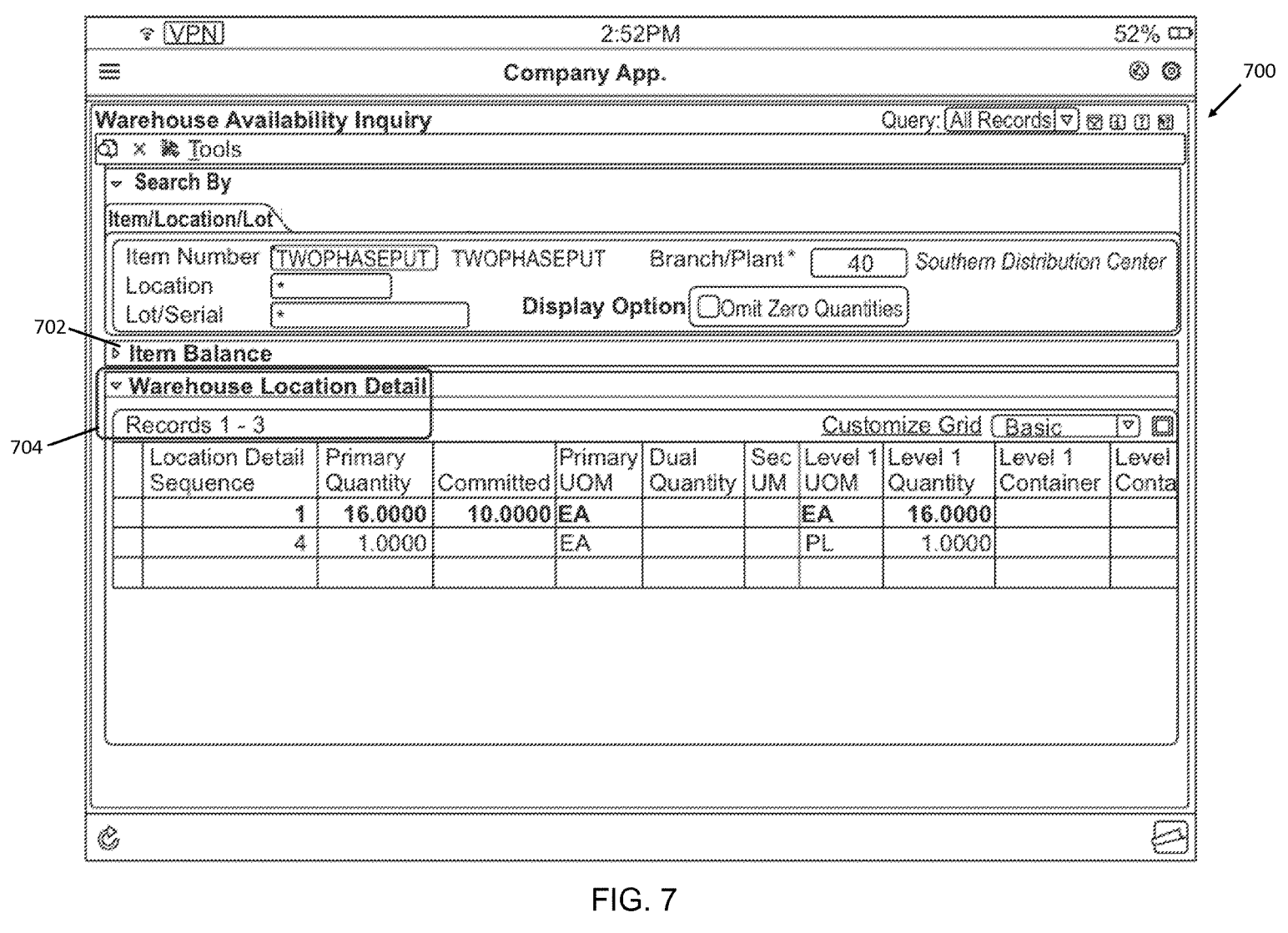

Thus far, the system has been described using three database information sources as examples, namely inventory data, warehouse data, and license plate data. However the systems and methods disclosed herein work equally well if one of the data sources, such as license plate data, is omitted, which may be the case for a number of companies that only use inventory and warehouse data. FIG. 7 shows a view of the user interface 700 that may be used in a system that does not use license plating functionality, although one of ordinary skill the art will appreciate that the window shown can also be integrated into a system that uses license plating functionality. In the illustration, a display is shown 700 where a user has searched for an item. The information returned is shown in two windows: an item balance window 702 (collapsed) and the warehouse location detail window 704. The warehouse location detail window 704 shows columns that allow a user to ascertain information such as location details sequence, the primary quantity of the items, the number of items that have been committed, the primary unit of measurement (UOM), and other information.

Figure 8A:
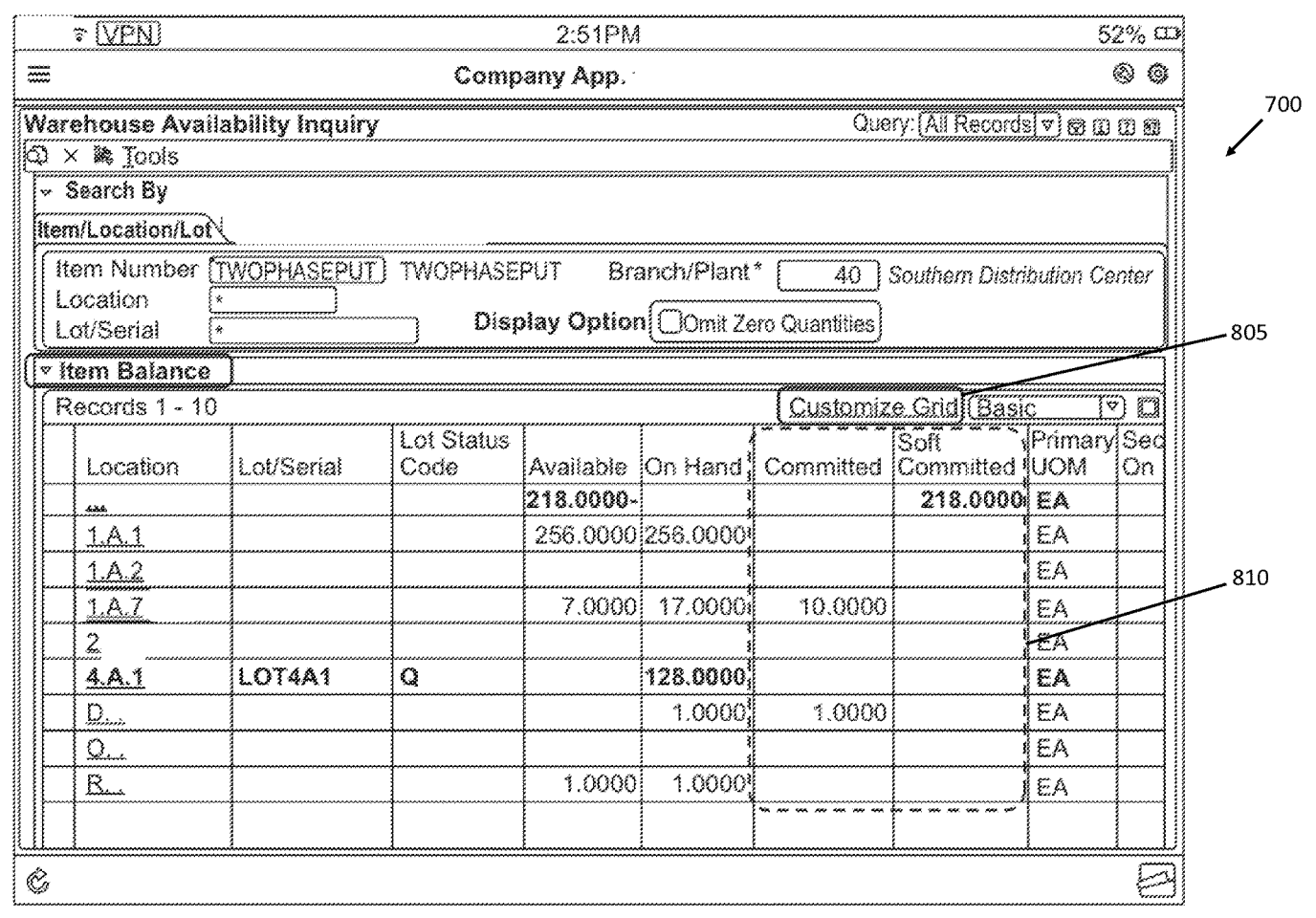

FIG. 8A illustrates another view of the example user interface 700 showing how a user may customize the information that is displayed within a view. Specifically, the user may select the customize grid function 805 which will bring up a number of column options a user may select for display (not shown).

The data shown in a column may come from any one of the databases shown in FIG. 1 or other information sources. For example, comparing FIG. 4 with FIG. 8 one sees that the item balance window is different: FIG. 4 shows columns concerning loose quantities and license plate quantities whereas in FIG. 8 a user has used to customize grid function 805 to display items that have been "Committed" or "Soft Committed" 810.

Figure 8B:
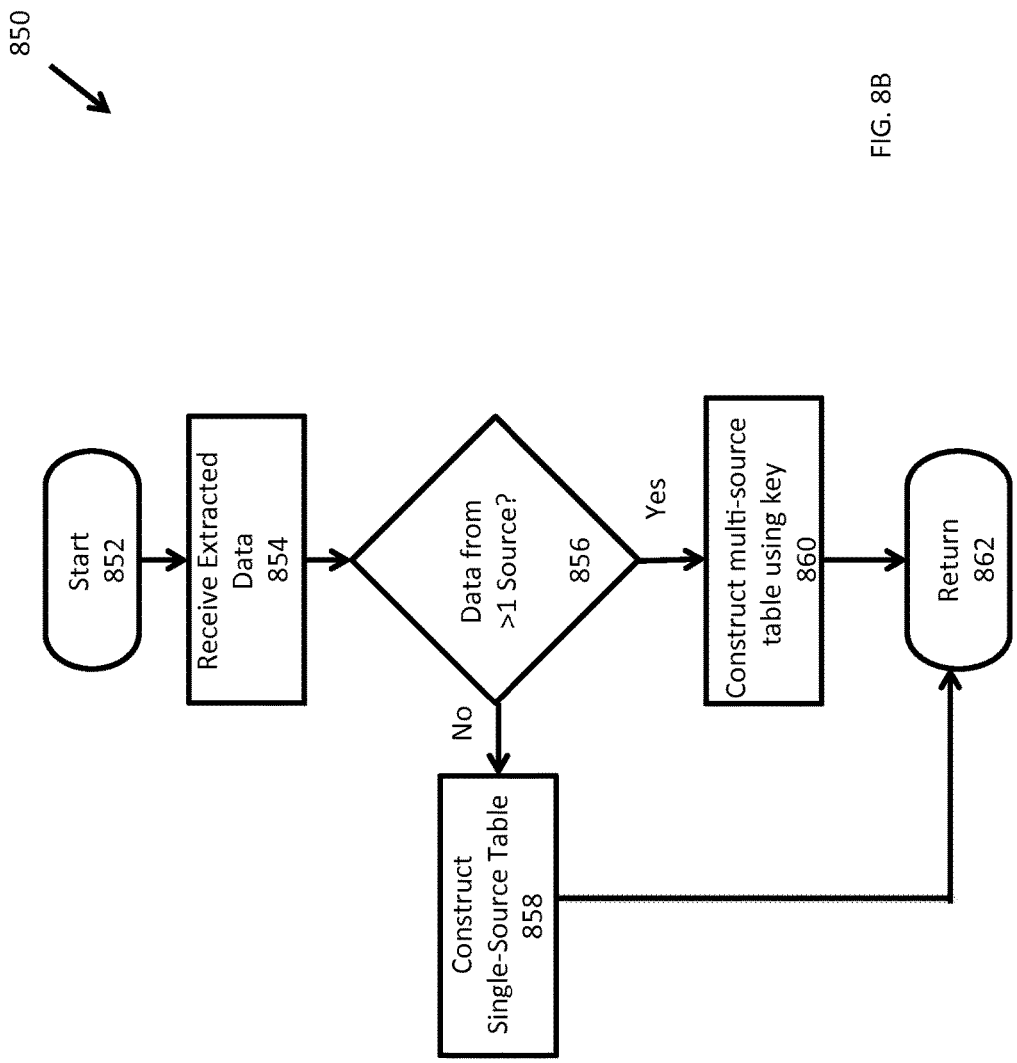
FIG. 8B shows an example method for processing logistics data integration.

FIG. 8B shows an example process 850 of how the integration process may be performed by the logic engine so that the user may implement customized grids featuring information from different information sources. At step 852, the process begins with the user query, and a determination completed by the analyzer within the logic engine as to whether additional data from the three sources, such as the inventory data at the warehouse data and the license plate data, is required. At step 854, the assembler receives the unintegrated information from the one or more sources. At step 856, the assembler may make a determination as to whether the received data is from one or multiple information sources. If the data is only from one source, then at step 858, the assembler may construct a single source table comprising the information, and return information for display processing at step 862. If the data is from multiple sources, then at step 860 the assembler may construct a multisource table using relational database technologies such as primary keys for each of the received tables from the one or more sources.

For example, if the user query is the license plate number "123" which is assigned to "widget07", then the process 850 may retrieve a license plate table from the license plate database using the license plate number "123", an inventory table from the inventory database using "widget07", and a warehouse table from the warehouse database using "widget07". Then at 860, the tables may be combined using relational database methods such as matching items or keys, such as primary keys, as is known in the art.

Figure 9:
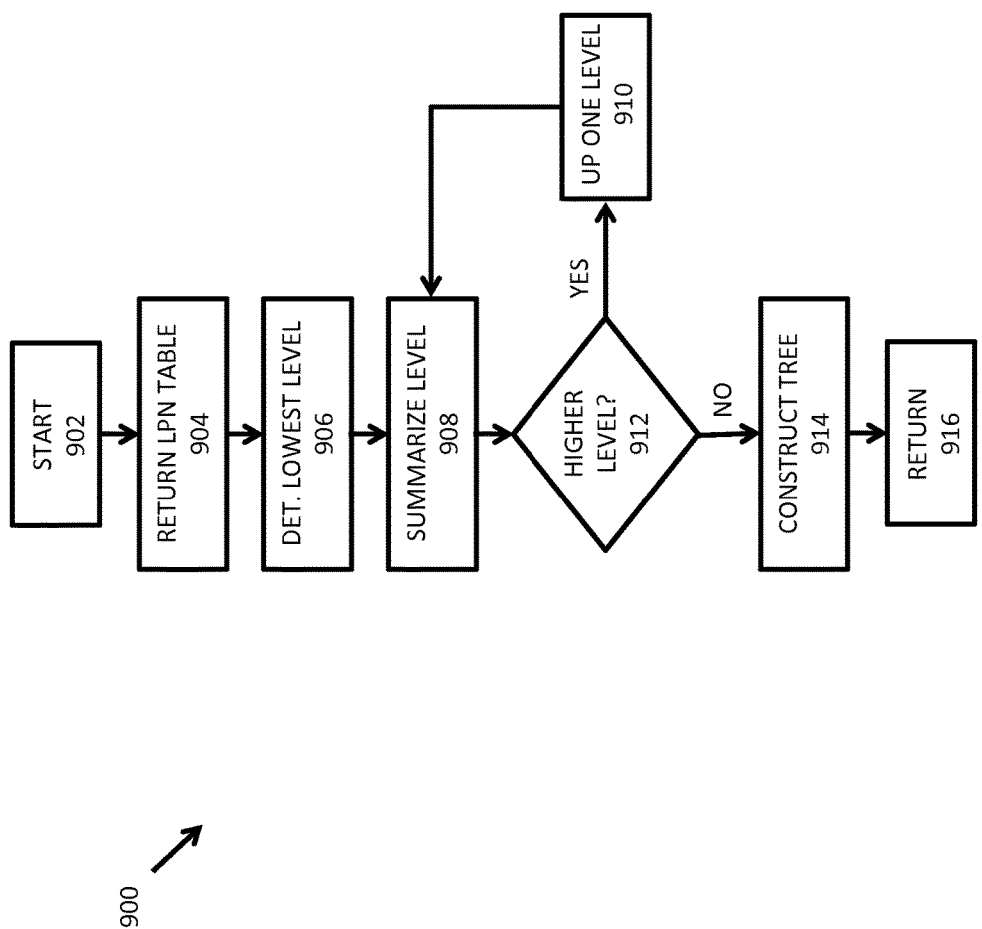
FIG. 9 shows an example method for processing logistics data summarization.
Figures 10A, 10B:
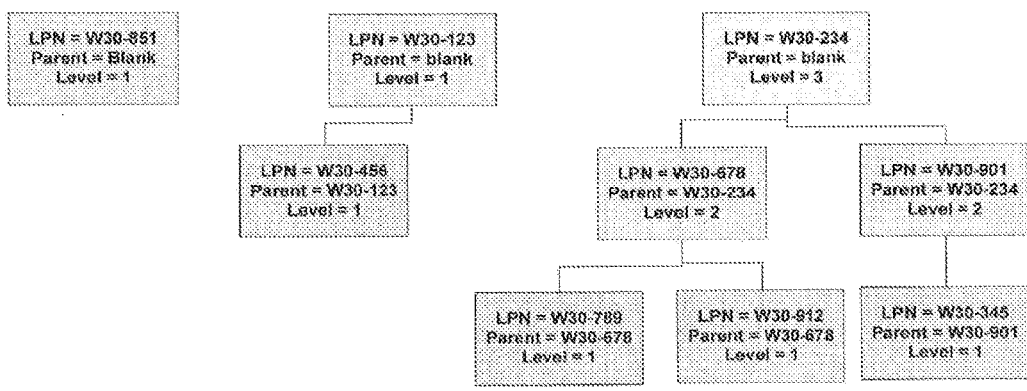
FIG. 10A illustrates a example table comprising license plate data.
FIG. 10B illustrates an example license plate hierarchy.

FIG. 9 shows one possible method that the logic engine may use to summarize the license plate data and create the license plate structure tree. At step 902, the user makes a query for an integrated logistics data set on an item. At step 904, the system accesses the license plate database through the multi-source API to retrieve the license plate table data as shown in FIG. 10A. At step 906 the system may use the table data shown in FIG. 10A to group the lowest license plate numbers in the level by finding all license plate numbers with parents and putting them in one group. Next at step 908 the system matches LPNs under the same parent as siblings to summarize the level.

At step 912, the system then determines whether any of the LPNs in the level have parents one level up. If yes, then the system goes one level up and groups the LPNs with parents and matches children LPNs under the same parent as their siblings. The process repeats until all LPNs have been mapped into a hierarchy at step 914, which is illustrated in FIG. 10B. One of ordinary skill in the art will appreciate that FIG. 10 B is merely a relational abstraction and may be used to output a display hierarchy to the user, as is shown FIG. 5, at 530. Further, though the process described summarizes from the "bottom up", the process may also be constructed "top-down", whereby the tree is created by starting with the highest level parent, then children are found, added, and grouped for each level. One advantage of summarizing from the bottom-up is that regardless of what item number or LPN a user queries, the results can always be summarized by searching for parents and then summarizing each level as additional parents are found.

Figure 11:
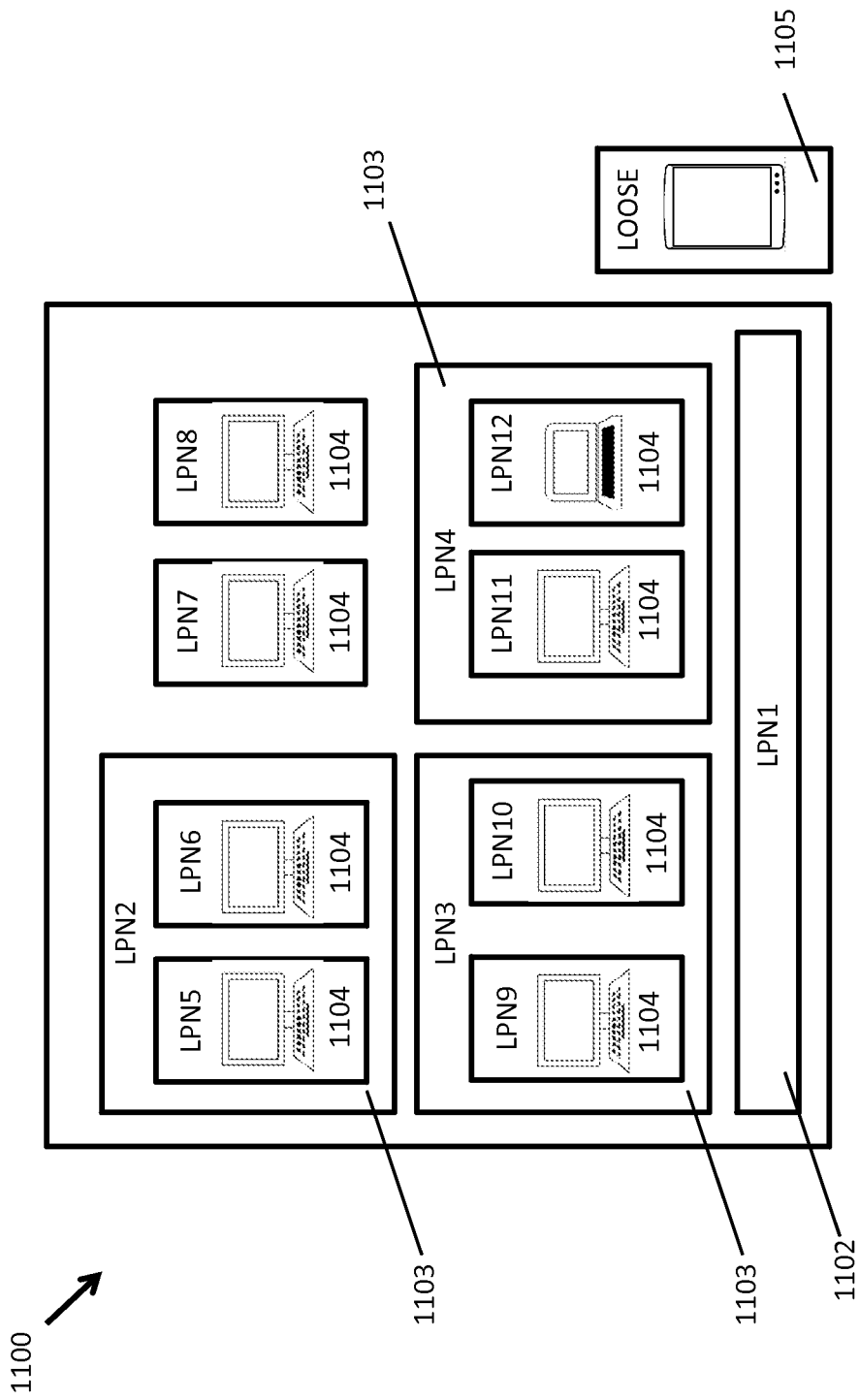
FIG. 11 illustrates an example screen display for implementing integrated logistics data.

Additional views, such as 2D spatial/pictorial structures may also be created from the relational abstraction information, as illustrated in FIG. 11. There, the top level license plate is shown as a pallet abstract 1102, which may contain lots LPN2, LPN3, and LPN4 in a lot level abstraction 1103, which may further contain additional cartons LPN5-LPN12 in a carton abstraction level 1104. The spatial view example may be displayed in a window instead of the license plate tree as shown in FIG. 5, at 530. Thus, the user would be able to complete his/her logistics query by manipulating virtual depictions of a pallet that the user can virtually take apart, all without cutting into the group of items or leaving the location to access multiple workstations and/or applications. Further, though the illustration in FIG. 11 shows a 2D structure, one of ordinary skill in the art can appreciate that the same processes can readily be used to create a 3D structures, which would allow a user to probe into the integrated logistics data in a 3D virtual environment resulting in a reality-enhanced integrated logistics toolset.

Notable from FIG. 11 (element 1105) and FIG. 1 (element 128) are loose items which have not been assigned license plates. Since loose items do not have assigned license plates, they are effectively hidden from the license plate system and architecture.

Figure 12:
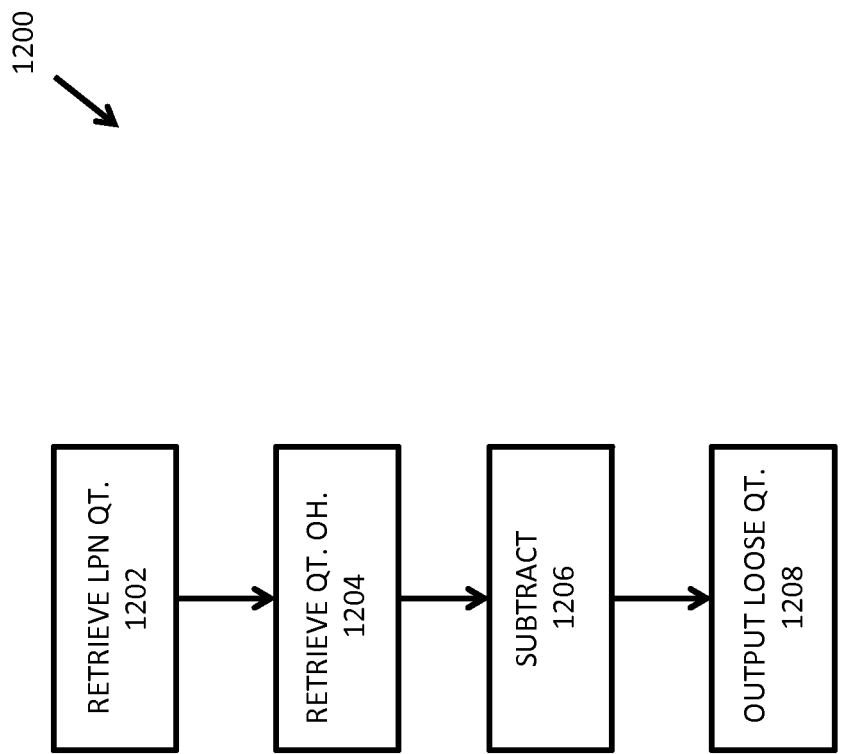
FIG. 12 shows an example method for determining loose quantities.

Typically inventory available/on-hand data matches license plate available/on-hand, however sometimes there is a discrepancy that can be used to obtain the loose item quantity. FIG. 12 shows one example process 1200 for finding loose items and returning those results to the user in a display. The process begins with retrieving the license plate data from the license plate database at step 1202. The retrieved license plate data can be, for instance, the license plate "Available" and "On-Hand" data from the license plate database 114. Next at step 1204 the system retrieves the quantity on hand information concerning the items from the inventory database 118. Once those two data sets have been retrieved, the system subtracts inventory quantity on hand from the license plate quantity to arrive at the loose quantity at 1206. From there, at step 1208, a loose quantity is generated or otherwise outputted for display.

FIG. 4 illustrates an example output of this process. There, row 410 shows an available quantity of 69, an on-hand quantity of 69, and a license plate quantity of 69. Thus, the user knows by looking at this information as displayed on his/her client device that all the items under "WIDGET7LOT2" are assigned license plates and are also accounted for in the inventory system. In contrast looking at row 412, the number of available items is 69 and the number on-hand is 69; however the license plate quantity is 64. When these two items are subtracted it produces the result, 5, which corresponds to a loose quantity.

The discrepancy in this example exists because the Available and On-Hand columns of FIG. 4 were retrieved from the inventory database 118. Whereas, the "License Plate Quantity" column is from the license plate database (which may also have data called "Available" and "On-hand", see FIG. 6). Thus, a loose item may have been inventoried but never assigned a license plate, and would thus be invisible to a license plating system.

By using the above process, a user would know that items under "WIDGET7LOT1" corresponded to an inventory of 69 items, 64 of which have license plates, and further that there is a quantity of 5 items that are "loose" and may be sitting on top of the pallet, for instance. In this way, a user implementing the system and methods disclosed can use the client device and application to not only track accounted for items but also unaccounted for "loose" items.

Therefore, what has been disclosed is a novel approach for managing assets by implementing integrated logistics queries. By retrieving multiple sets of logistics data, such as inventory data, warehouse data, and license plate data, and processing them using processes such as summarization and integration, a final integrated logistics data set may be generated that can be displayed and manipulated on mobile devices, such as a tablet computer. The invention provides numerous advantages over previous methods where a warehouse user inquiring into what a given pallet contains, for example, may be forced to either cut into the pallet to ascertain its structure or write down the item number and go to a remote desktop workstation to get the required information. In contrast, using the disclosed invention allows a warehouse user to simply enter an item number into a mobile device and receive results in the form of an integrated logistics data set, which the user can drill into to quickly figure out logistics information such as how many items are available, committed, and what their physical structure is, without cutting into a pallet or leaving the work area. The invention also creates new data that was previously not available from the logistics databases, such as loose quantity. Further, the invention also offers the warehouse worker an array of user interface options which streamline efficiency, such as collapsible windows, hierarchical structure trees, and 2D/3D virtual views of warehouse logistics information.

SYSTEM ARCHITECTURE OVERVIEW

Figure 13:
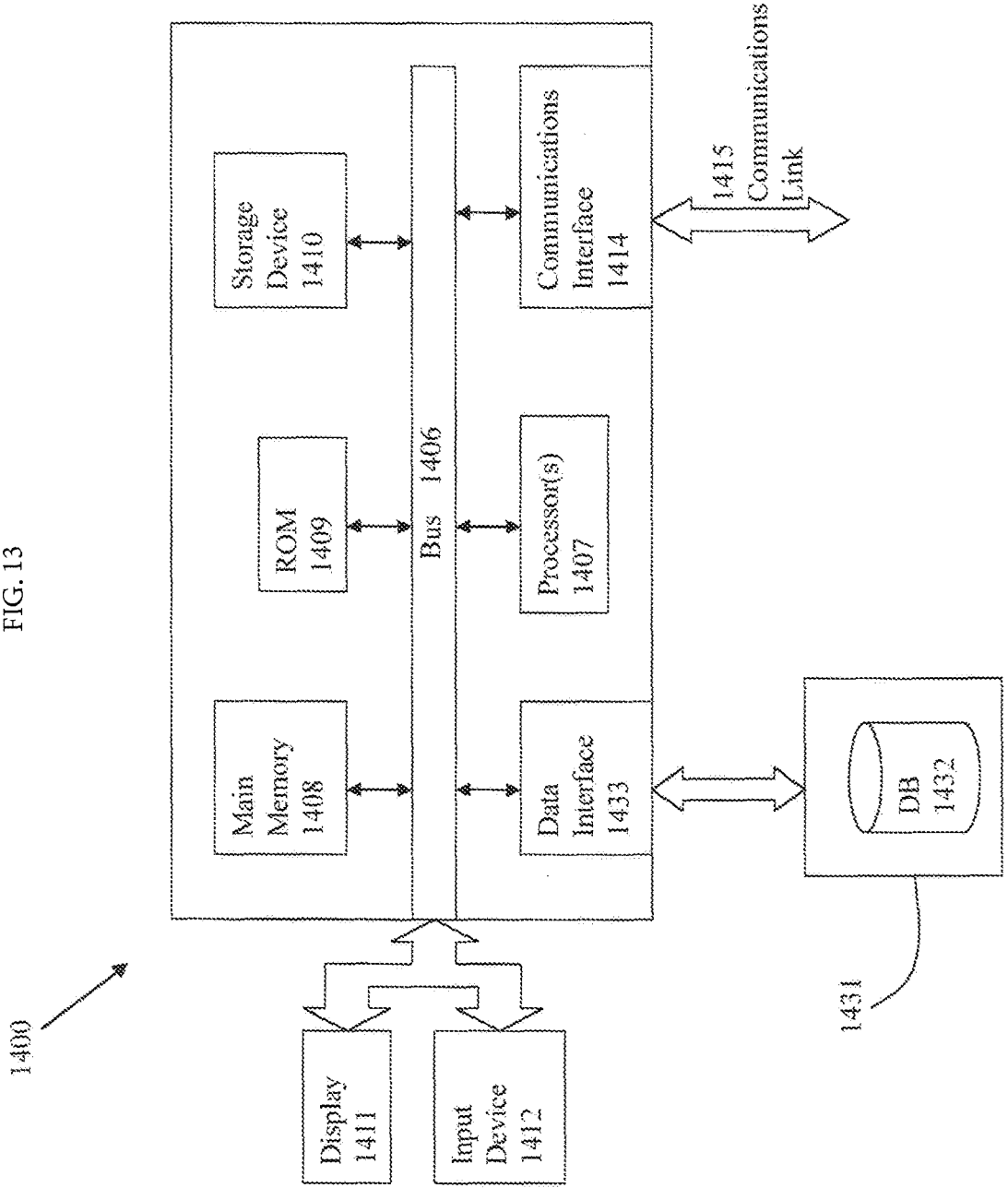
FIG. 13 illustrates example system architecture.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for displaying managed assets, the computer implemented method comprising:
   maintaining a view module that generates a user interface that displays an integrated data set from a plurality of databases for a particular item, the user interface having a first collapsible display portion and a second collapsible display portion,
      the first collapsible display portion comprising:
         a plurality of rows, each row of the plurality of rows corresponding to specific item locations of the particular item,
         a plurality of columns that corresponds to each of the plurality of rows, the plurality of columns comprising a first column corresponding to a specific location data represented as a hyperlink, wherein the plurality of columns further comprises one or more additional columns corresponding to item quantities,
      the second collapsible display portion comprising a second plurality of columns, the second plurality of columns comprising a column that displays a hierarchical tree corresponding to the specific location data of the particular item, the second plurality of columns further comprising one or more additional columns corresponding to item container information, wherein the first collapsible display portion is collapsed upon receiving a user action on the hyperlink and the second collapsible display portion is displayed with the specific location data of the particular item location;
   querying, by a mobile client device, a first item using an identifier of the first item;
   retrieving, by an application, a first data set from a database chosen from a plurality of databases that correspond to the first item based at least in part on the identifier received from the mobile client device, the first data set retrieved as relational data;
   retrieving, by the application, a second data set from the plurality of databases that correspond to the first item, where the second data set is from a different database than the first data set;
   creating the integrated data set corresponding to the first item by combining the first data set and the second data set, wherein at least a portion of the integrated data set comprises hierarchical data created from the relational data by:
      identifying children records from the relational data by grouping records having parent identifiers, and
      for each child record, mapping the each child record into the hierarchy by:
         identifying sibling records by matching children records having a same parent identifier, and
         identifying a parent record by matching a parent identifier with a record within the relational data having the parent identifier as its identifier;
   consolidating an output corresponding to the integrated data set, the output comprising the hierarchical data and layout data for displaying a hierarchical structure tree;
   sending the output to the mobile client device; and
   displaying, in a graphical user interface on the mobile client device, the output, comprising:
      displaying, in the collapsible first display portion, one or more item locations of the first item, and
      upon receiving a user action on the hyperlink for the specific location data of the first item, collapsing the collapsible first display portion and displaying, in the collapsible second display portion, at least the hierarchical tree in the column of the second plurality of columns.

2. The method of claim 1 further comprising:
   retrieving, by an application, a third data set from the plurality of databases that correspond to the first item, wherein the third data set is from a different database than the first and second data sets.

3. The method of claim 1, wherein the hierarchical structure tree is a license plate hierarchy for a particular grouping of items.

4. The method of claim 3, wherein the output includes information on how to display the integrated data in collapsible windows.

5. The method of claim 1, wherein at least a portion of the integrated data set is used to create a customized grid.

6. The method of claim 5, wherein the customized grid is created by constructing a multisource table using primary keys for each received tables from the plurality of databases.

7. The method of claim 1, wherein a portion of the integrated data set is created using an integration process.

8. The method of claim 1 wherein combining the integrated data sets creates new data that is not available in the plurality of databases.

9. The method of claim 1, further comprising:
   identifying a loose quantity data item from the integrated data set;
   upon receiving a user selection on a row in the column of the second plurality of columns in the second collapsible display portion, collapsing the collapsible second display portion and displaying, in a third collapsible display portion, additional information corresponding to the first item;
   identifying one or more item quantities based at least in part on a number of items available, a number of items on hand, a number of items physically present but not committed, a license plate quantity, a loose quantity, or a committed quantity;
   identifying one or more item container information based at least in part on a container code, a container code description, a container unit of measurement (UOM), or a container UOM description;
   upon displaying the output immediately after consolidating the output, displaying the first collapsible display portion as an expanded display portion and displaying the second collapsible display portion as a collapsed display portion;
   scanning an identifier of a first item initiates the querying of the first item; and
   maintaining a logic engine comprising an analysis module, an extractor multi-source applications programming interface (API), an assembler module, and a view configuration module, the analysis module receiving the querying of the first item, the extractor multi-source API retrieving data from one or more databases corresponding to the first item, the assembler module assembling the data into the integrated data set, and the view configuration module configuring a view displaying the integrated data set.

10. The method of claim 1, wherein the integrated data set includes at least one of the following: license plate data, inventory data, and warehouse data.

11. A system for managing assets, comprising:
a computer processor to execute a set of program code instructions; and
a memory to hold the program code instructions, in which the program code instructions comprises program code to perform:
  maintaining a view module that generates a user interface that displays an integrated data set from a plurality of databases for a particular item, the user interface having a first collapsible display portion and a second collapsible display portion,
    the first collapsible display portion comprising:
      a plurality of rows, each row of the plurality of rows corresponding to specific item locations of the particular item,
      a plurality of columns that corresponds to each of the plurality of rows, the plurality of columns comprising a first column corresponding to a specific location data represented as a hyperlink, wherein the plurality of columns further comprises one or more additional columns corresponding to item quantities,
    the second collapsible display portion comprising a second plurality of columns, the second plurality of columns comprising a column that displays a hierarchical tree corresponding to the specific location data of the particular item, the second plurality of columns further comprising one or more additional columns corresponding to item container information, wherein the first collapsible display portion is collapsed upon receiving a user action on the hyperlink and the second collapsible display portion is displayed with the specific location data of the particular item location;
  querying, by a mobile client device, a first item using an identifier of the first item;
  retrieving, by an application, a first data set from a database chosen from a plurality of databases that correspond to the first item based at least in part on the identifier received from the mobile client device, the first data set retrieved as relational data;
  retrieving, by the application, a second data set from the plurality of databases that correspond to the first item, where the second data set is from a different database than the first data set;
  creating the integrated data set corresponding to the first item by combining the first data set and the second data set, wherein at least a portion of the integrated data set comprises hierarchical data created from the relational data by:
    identifying children records from the relational data by grouping records having parent identifiers, and for each child record, mapping the each child record into the hierarchy by:
      identifying sibling records by matching children records having a same parent identifier, and
      identifying a parent record by matching a parent identifier with a record within the relational data having the parent identifier as its identifier;
  consolidating an output corresponding to the integrated data set, the output comprising the hierarchical data and layout data for displaying a hierarchical structure tree;
  sending the output to the mobile client device; and
  displaying, in a graphical user interface on the mobile client device, the output, comprising:
    displaying, in the collapsible first display portion, one or more item locations of the first item, and
    upon receiving a user action on the hyperlink for the specific location data of the first item, collapsing the collapsible first display portion and displaying, in the collapsible second display portion, at least the hierarchical tree in the column of the second plurality of columns.

12. The system of claim 11, wherein the program code instructions comprise program code to further perform,
retrieving a third data set from the plurality of databases that correspond to the first item, wherein the third data set is from a different database than the first and second data sets.

13. The system of claim 11, wherein the hierarchical structure tree is a license plate hierarchy for a particular grouping of items.

14. The system of claim 11, wherein at least a portion of the integrated data set is created using one of the following: a summarization process or an integration process.

15. The system of claim 11 wherein the integrated data sets include new data that is not available in the plurality of databases.

16. The system of claim 11, wherein the program code instructions comprise program code to further perform:
  identifying a loose quantity data item from the integrated data set;
  upon receiving a user selection on a row in the column of the second plurality of columns in the second collapsible display portion, collapsing the collapsible second display portion and displaying, in a third collapsible display portion, additional information corresponding to the first item;
  identifying one or more item quantities based at least in part on a number of items available, a number of items on hand, a number of items physically present but not committed, a license plate quantity, a loose quantity, or a committed quantity;
  identifying one or more item container information based at least in part on a container code, a container code description, a container unit of measurement (UOM), or a container UOM description;
  upon displaying the output immediately after consolidating the output, displaying the first collapsible display portion as an expanded display portion and displaying the second collapsible display portion as a collapsed display portion;
  scanning an identifier of a first item initiates the querying of the first item; and
  maintaining a logic engine comprising an analysis module, an extractor multi-source applications programming interface (API), an assembler module, and a view configuration module, the analysis module receiving the querying of the first item, the extractor multi-source API retrieving data from one or more databases corresponding to the first item, the assembler module assembling the data into the integrated data set, and the view configuration module configuring a view displaying the integrated data set.

17. A computer program product embodied on a non-transitory computer readable medium, the non-transitory computer readable medium having stored thereon a sequence of instructions which, when executed by a processor causes the processor to execute a method for accessing stream data corresponding to an electronic design, the method comprising:

maintaining a view module that generates a user interface that displays an integrated data set from a plurality of databases for a particular item, the user interface having a first collapsible display portion and a second collapsible display portion, the first collapsible display portion comprising:

a plurality of rows, each row of the plurality of rows corresponding to specific item locations of the particular item, a plurality of columns that corresponds to each of the plurality of rows, the plurality of columns comprising a first column corresponding to a specific location data represented as a hyperlink, wherein the plurality of columns further comprises one or more additional columns corresponding to item quantities, the second collapsible display portion comprising a second plurality of columns, the second plurality of columns comprising a column that displays a hierarchical tree corresponding to the specific location data of the particular item, the second plurality of columns further comprising one or more additional columns corresponding to item container information, wherein the first collapsible display portion is collapsed upon receiving a user action on the hyperlink and the second collapsible display portion is displayed with the specific location data of the particular item location;

querying, by a mobile client device, a first item using an identifier of the first item;

retrieving, by an application, a first data set from a database chosen from a plurality of databases that correspond to the first item based at least in part on the identifier received from the mobile client device, the first data set retrieved as relational data;

retrieving, by the application, a second data set from the plurality of databases that correspond to the first item, where the second data set is from a different database than the first data set;

creating the integrated data set corresponding to the first item by combining the first data set and the second data set, wherein at least a portion of the integrated data set comprises hierarchical data created from the relational data by:

identifying children records from the relational data by grouping records having parent identifiers, and for each child record, mapping the each child record into the hierarchy by:

identifying sibling records by matching children records having a same parent identifier, and identifying a parent record by matching a parent identifier with a record within the relational data having the parent identifier as its identifier;

consolidating an output corresponding to the integrated data set, the output comprising the hierarchical data and layout data for displaying a hierarchical structure tree;

sending the output to the mobile client device; and displaying, in a graphical user interface on the mobile client device, the output, comprising:

displaying, in the collapsible first display portion, one or more item locations of the first item, and upon receiving a user action on the hyperlink for the specific location data of the first item, collapsing the collapsible first display portion and displaying, in the collapsible second display portion, at least the hierarchical tree in the column of the second plurality of columns.

18. The method of claim 17 further comprising:

retrieving a third data set from the plurality of databases that correspond to the first item, wherein the third data set is from a different database than the first and second data sets.

19. The method of claim 17, wherein the hierarchical structure tree is a license plate hierarchy for a particular grouping of items.

20. The method of claim 17, wherein at least a portion of the integrated data set is created using one of the following: a summarization process for an integration process.

21. The method of claim 17 wherein combining the integrated data sets creates new data that is not available in the plurality of databases.

22. The method of claim 17, further comprising:

identifying a loose quantity data item from the integrated data set;

upon receiving a user selection on a row in the column of the second plurality of columns in the second collapsible display portion, collapsing the collapsible second display portion and displaying, in a third collapsible display portion, additional information corresponding to the first item;

identifying one or more item quantities based at least in part on a number of items available, a number of items on hand, a number of items physically present but not committed, a license plate quantity, a loose quantity, or a committed quantity;

identifying one or more item container information based at least in part on a container code, a container code description, a container unit of measurement (UOM), or a container UOM description;

upon displaying the output immediately after consolidating the output, displaying the first collapsible display portion as an expanded display portion and displaying the second collapsible display portion as a collapsed display portion;

scanning an identifier of a first item initiates the querying of the first item; and maintaining a logic engine comprising an analysis module, an extractor multi-source applications programming interface (API), an assembler module, and a view configuration module, the analysis module receiving the querying of the first item, the extractor multi-source API retrieving data from one or more databases corresponding to the first item, the assembler module assembling the data into the integrated data set, and the view configuration module configuring a view displaying the integrated data set.

* * * * *

UNITED STATES PATENT AND TRADEMARK OFFICE
CERTIFICATE OF CORRECTION

| | | |
|---|---|---|
| PATENT NO. | : 9,824,329 B2 | Page 1 of 1 |
| APPLICATION NO. | : 14/491938 | |
| DATED | : November 21, 2017 | |
| INVENTOR(S) | : Stirling et al. | |

It is certified that error appears in the above-identified patent and that said Letters Patent is hereby corrected as shown below:

In the Specification

In Column 5, Line 5, delete "and or" and insert -- and/or --, therefor.

In Column 10, Lines 61-65, delete "embodiments of the invention, two or more computer systems 1400 coupled by communication link 1415 (e.g., LAN, PSTN, or wireless network) may perform the sequence of instructions required to practice the invention in coordination with one another." and insert the same on Column 10, Line 60 as a continuation of the same paragraph.

Signed and Sealed this
Third Day of July, 2018

Andrei Iancu
*Director of the United States Patent and Trademark Office*